United States Patent
Gailloux et al.

(10) Patent No.: US 8,254,308 B1
(45) Date of Patent: Aug. 28, 2012

(54) METHOD AND SYSTEM FOR ACOUSTICALLY TRIGGERING ELECTRONIC COUPON RETRIEVAL

(75) Inventors: Mike Gailloux, Overland Park, KS (US); Devon Biere, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1094 days.

(21) Appl. No.: 11/325,727

(22) Filed: Jan. 5, 2006

(51) Int. Cl.
H04W 4/00 (2009.01)

(52) U.S. Cl. ........... 370/328; 370/310.2; 370/349; 455/422.1; 725/14; 705/14.1; 704/270

(58) Field of Classification Search ........... 370/312, 370/313, 486, 487, 310.2, 328–339, 349, 370/528, 529; 725/14–19, 9; 455/422.1; 705/14.1–14.39; 235/383, 487; 704/270, 704/270.1
See application file for complete search history.

(56) References Cited

U.S. PATENT DOCUMENTS

| | | | |
|---|---|---|---|
| 5,500,681 A * | 3/1996 | Jones | 348/473 |
| 6,871,180 B1 * | 3/2005 | Neuhauser et al. | 704/500 |
| 6,990,453 B2 * | 1/2006 | Wang et al. | 704/270 |
| 7,222,071 B2 * | 5/2007 | Neuhauser et al. | 704/231 |
| 2001/0032251 A1 * | 10/2001 | Rhoads et al. | 709/217 |
| 2002/0080759 A1 * | 6/2002 | Harrington et al. | 370/338 |
| 2003/0005430 A1 * | 1/2003 | Kolessar | 725/9 |
| 2003/0115587 A1 * | 6/2003 | Kendall et al. | 725/9 |
| 2003/0144035 A1 * | 7/2003 | Weinblatt et al. | 455/566 |
| 2003/0171096 A1 * | 9/2003 | Ilan et al. | 455/3.06 |
| 2004/0073577 A1 * | 4/2004 | Brady et al. | 707/104.1 |
| 2004/0169851 A1 | 9/2004 | Petrovic et al. | |
| 2005/0114881 A1 * | 5/2005 | Philyaw et al. | 725/25 |
| 2005/0227674 A1 | 10/2005 | Kopra et al. | |
| 2006/0148448 A1 | 7/2006 | Turner | |

OTHER PUBLICATIONS

Apple, Apple Launches the iTunes Music Store, Apr. 28, 2003, Apple.*

* cited by examiner

*Primary Examiner* — Hoon J Chung

(57) ABSTRACT

A method and system for acoustically triggering wireless network communication and reporting. A portable device monitors external audio waveforms comprising broadcast media, to detect at least one predefined acoustic frequency embedded in the waveforms. In response to the detection, the portable device takes an action with respect to a wireless network, preferably relating to the at least one detected acoustic frequency. The invention can be used advantageously to monitor broadcast media consumption.

20 Claims, 6 Drawing Sheets

FIG. 3

| ACTION TABLE ||
|---|---|
| EXAMPLE CODE | ACTION |
| 123* | TRANSLATE THE CODE LOCALLY BY USING A TRANSLATION TABLE |
| CZY | TRANSLATE THE CODE BY COMMUNICATION OVER A WIRELESS NETWORK |
| A#T | SEND A HTTP REQUEST TO A URL AND INCLUDE THE CODE AS A QUERY PERAMETER |
| 555555 | REPORT THE CODE TO A PARTICULAR URL |

FIG. 4

| TRANSLATION TABLE ||
|---|---|
| EXAMPLE CODE | DATA |
| 1234 | INTERNET ADDRESS |
| 123& | INFORMATION ABOUT A PARTICULAR BROADCAST |
| 123ABCD | ELECTRONIC COUPON |
| 123555 | ADVERTISEMENT |

220

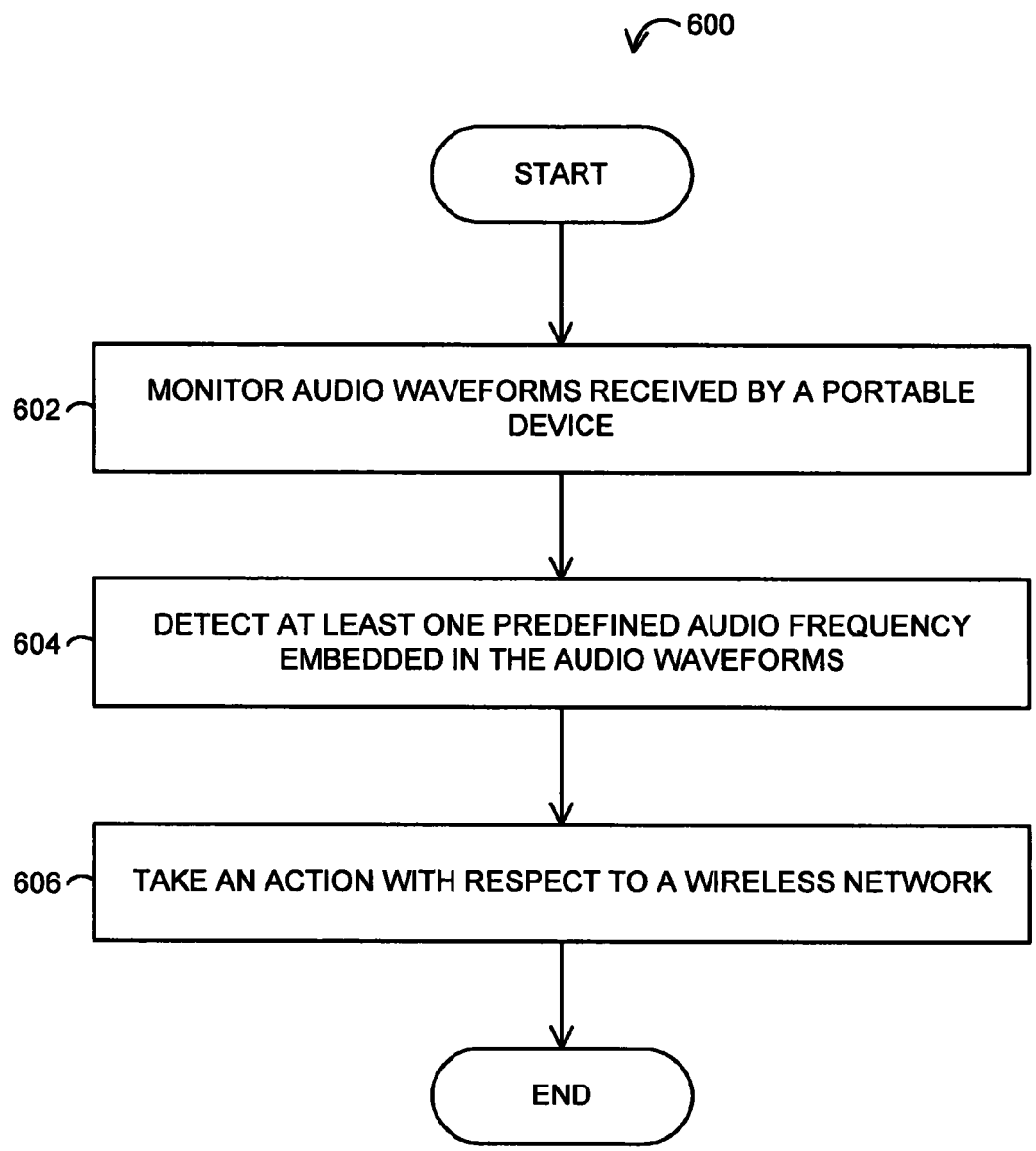

METHOD AND SYSTEM FOR ACOUSTICALLY TRIGGERING ELECTRONIC COUPON RETRIEVAL

FIELD OF THE INVENTION

The present invention relates to tracking media consumption by people. In particular, the present invention uses portable devices such as cellular phones to track what media people are listening to and/or watching.

DESCRIPTION OF RELATED ART

With continued advances in technology, people are consuming more broadcast media (e.g., television programs, radio programs, advertisements, or any other audio/video output from television, radio, satellite, interne or private communication system). For instance, people are listening to and/or watching more broadcast media than in the past. Over the recent years, many changes have occurred in the broadcasting industry. For example, radio and television are moving towards the Internet, television is being viewed on portable devices (e.g., Personal Digital Assistants (PDAs), smart phones, cellular phones and personal computers), and Internet is being accessed on television sets.

With the continuing growth of broadcast media, broadcasters are searching for new and effective ways to find channel and programming preferences of users. Meanwhile, advertisers are searching for new approaches to penetrate advertising mediums, and to evaluate the effectiveness of marketing campaigns. Currently, companies paying for advertising during television or radio programs are trying to determine which types of advertising people prefer. Thus, advertisers and broadcasters are trying to find new and effective ways to track media consumption.

SUMMARY

The present invention provides an improved method for tracking broadcast media consumption by users. As disclosed herein, a portable device monitors external audio waveforms comprising broadcast media to detect at least one predefined acoustic frequency embedded in the audio waveforms. In response to the detection, the portable device then takes an action with respect to a wireless network, wherein the action relates to the predefined acoustic frequency. Taking an action with respect to a wireless network comprises reporting an indication of the predefined acoustic frequency (e.g., information about a particular broadcast).

In accordance with an exemplary embodiment, an application on a portable device receives external audio waveforms comprising at least one embedded predefined acoustic frequency that corresponds to a digital code. The digital code can be detected by the portable device as an indication of the particular broadcast media being provided in the audio waveforms.

Accordingly, a microphone in the portable device captures the audio waveforms. The application in the portable device converts the captured audio waveforms into a digital bit stream. In turn, the application analyzes the digital bit stream to locate a digital code corresponding to the embedded predefined acoustic frequency. Upon locating the digital code, the application compares the digital code to a list of digital codes stored in the portable device. If the application finds a digital code in the list that matches the digital code in the digital bit stream, the application may retrieve data stored in the portable device representing or corresponding with the digital code. The data may be an Internet address, information about a particular media broadcast, an electronic coupon, and/or an advertisement.

Responsively, the application then takes an action with respect to a wireless network. Taking an action involves the portable device transmitting the digital code and/or data representing the digital code over a wireless network to a server. The server may receive the digital code and/or data representing the digital code, and therefore store the digital code and/or data representing the digital code in data storage. The server may use the stored digital code and/or data representing the digital code as a basis to track media consumption. For instance, over time, the server may continue to receive digital codes and/or data representing the digital codes from the portable device and from other such portable devices. The server may then aggregate the digital codes and/or data representing the digital codes. The aggregated digital codes and/or data representing the digital codes may provide information about the broadcast media people are listening to and/or watching.

Broadcasters and advertisers may collect the information about the broadcast media to determine channel and programming preferences, to penetrate advertising mediums, and to evaluate the effectiveness of marketing campaigns. The collected information may include (i) types of broadcast media people are listening to and/or watching (i.e., television programs, radio programs, internet programs and advertisements), (ii) types of broadcast mediums people use to listen to and/or watch the broadcast media (i.e., television, radio, satellite, internet and private communication system), (iii) demographic data on the people that are listening to and/or watching the broadcast media (i.e., age, ethnicity, education and religion), and (iv) locations where people are listening to and/or watching the broadcast media (i.e., homes, airports and workplaces).

Using the collected information, broadcasters may determine which programs are most popular, while advertisers may evaluate the type of advertisements that are most effective during these programs. Thus, advertisers and broadcasters may find new and effective ways to track media consumption.

These as well as other aspects, advantages, and alternatives will become apparent to those of ordinary skill in the art by reading the following detailed description, with reference where appropriate to the accompanying drawings. Further, it should be understood that the foregoing summary and the description provided below are set forth for purposes of example only and that many variations are possible, within the scope of the claims.

BRIEF DESCRIPTION OF THE DRAWINGS

FIG. 3 is a block diagram of a server operable within the exemplary embodiment.

FIG. 4 is a flow chart depicting functions that can be carried out in accordance with the exemplary embodiment.

FIG. 6 depicts an exemplary translation-table usable in the exemplary embodiment.

DETAILED DESCRIPTION

1. Overview

Figure 1:
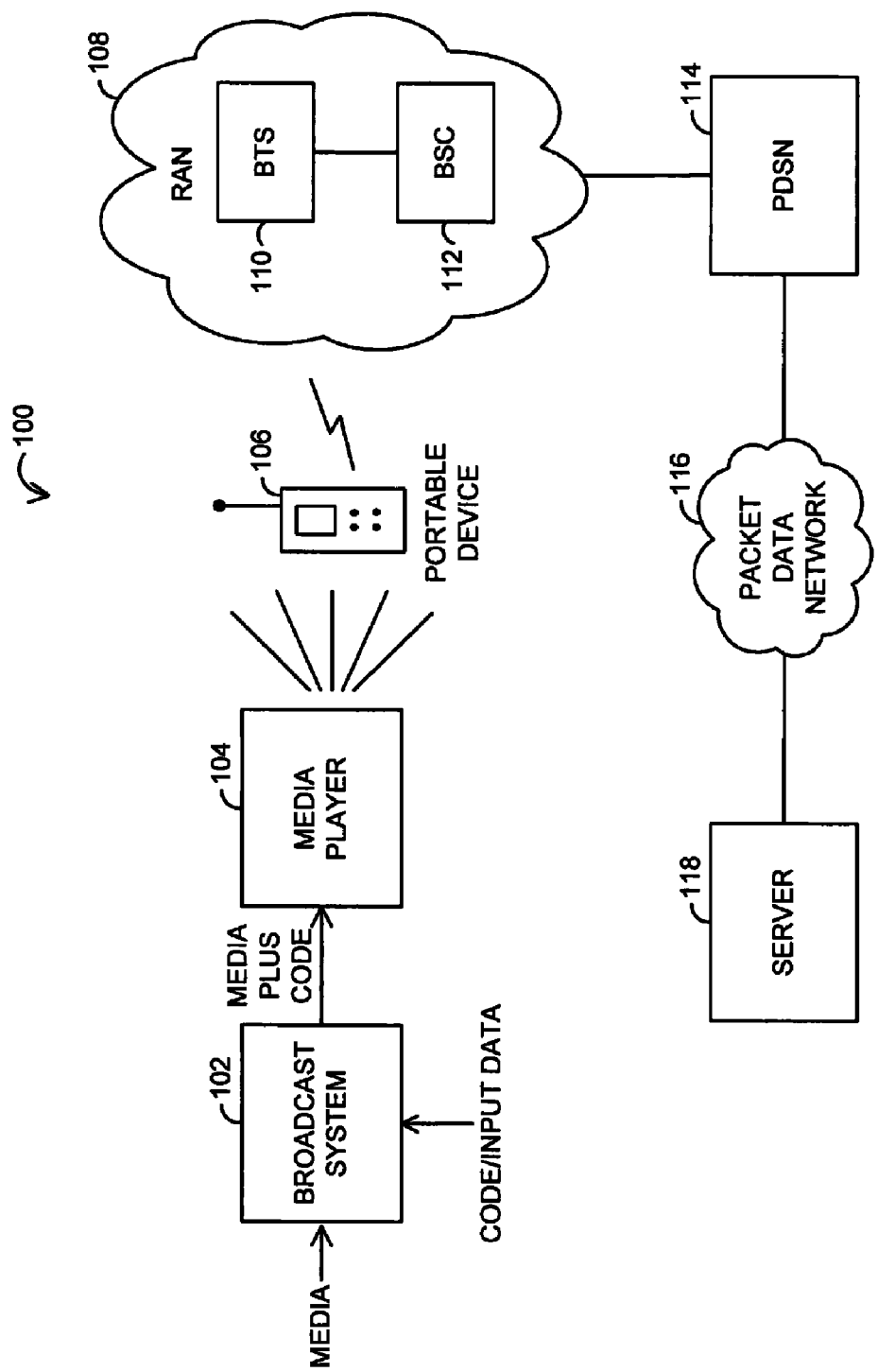
FIG. 1 is generally illustrates a communication system in which an exemplary embodiment may be employed.

FIG. 1 generally illustrates a communication system 100 in which the exemplary embodiment may be employed. It should be understood, of course, that this and other arrangements and functions described herein are set forth for purposes of example only. As such, those skilled in the art will appreciate that other arrangements and other elements can be used instead, and elements can be added, omitted, combined, distributed, re-ordered, re-positioned, or modified in other ways. Further, various functions described herein as being performed by one or more entities may be carried out by hardware, firmware, and/or software logic. For instance, various functions may be carried out by a processor executing instructions stored in memory.

The communication system 100 includes a broadcast system 102, a media player 104, a portable device 106, and a server 118. The portable device 106 communicates with the server 118 over a wireless network that includes a radio access network (RAN) 108, a packet data serving node (PDSN) 114, and a packet data network 116.

As shown in FIG. 1, code and/or input data are mixed with broadcast media by the broadcast system 102. The code is preferably a digital code (e.g. 00000001) although the code may be any type of code or information that can be converted into a digital code. The code will hereby be referred to as a digital code. The input data may be any type of information that a broadcaster and/or an advertiser may wish to transmit with the digital code and broadcast media, such as information about a particular broadcast. The code and/or input data are capable of being detected by the potable device 106 as an indication of the particular broadcast media.

Accordingly, the broadcast system 102 may receive the broadcast media, digital code and/or input data. The broadcast system 102 may then convert the broadcast media, digital code and/or input data into audio waveforms by embedding acoustic frequencies corresponding to broadcast media, digital code and/or input data in the audio waveforms. In particular, the digital code and/or input data may correspond to at least one embedded predefined acoustic frequency inaudible to the human ear (e.g., approximately less than 20 Hertz or greater than 20,000 Hertz) in the audio waveforms. On the other hand, the broadcast media may correspond to embedded acoustic frequencies audible to the human ear (e.g., approximately between 20 Hertz to 2000 Hertz) in the audio waveforms. The broadcast system 102 may then transmit the audio waveforms comprising broadcast media, digital code and/or input data to media player 104.

The media player 104 may emit the audio waveforms with embedded acoustic frequencies corresponding to broadcast media, digital code and/or input data. The media player 104 may emit the audio waveforms acoustically such that the portable device 106 can detect the digital code and/or input data within the audio waveforms.

If the media player emits the audio waveforms within a range of a microphone in the portable device 106, the microphone may capture these audio waveforms. Once the microphone captures the audio waveforms, an application in the portable device 106 may convert the embedded acoustic frequencies in the audio waveforms into a digital bit stream. In turn, the application may analyze the digital bit stream to locate a digital code corresponding to at least one embedded predefined acoustic frequency. Upon locating the digital code, the application may compare the digital code to a list of digital codes in an action table in the portable device. The action table may include actions that correspond to each digital code in the list. If the application finds a digital code in the action table that matches the digital code in the digital bit stream, the application performs the action in the action table that corresponds to the digital code. The action preferably involves taking an action with respect to a wireless network.

In one embodiment, the action may involve retrieving data stored in the portable device 106 before taking an action with respect to a wireless network. The application may retrieve the data representing the digital code using a translation table stored in the portable device 106. The data representing the digital code may be an Internet address, information about a particular media broadcast, an electronic coupon, and/or an advertisement, for instance.

The application preferably takes an action with respect to a wireless network that includes radio access network (RAN) 108, a packet data serving node (PDSN) 114, and a packet data network 116. Taking an action preferably involves the portable device transmitting the digital code, input data, and/or data representing the digital code over the wireless network to server 118. The server 118 may receive the digital code, input data, and/or data representing the digital code, and may store the digital code, input data and/or data representing to the digital code in data storage.

In addition to transmitting the digital code, input data, and/or data representing the digital code, the portable device 106 may transmit a request to send information (e.g., electronic coupon, video game and token points) back to the portable device 106. This information may relate to the digital code, input data, and/or data representing the digital code. Upon receiving this request, the server 118 may transmit the information to the portable device 106.

The server 118 may use the stored digital code, input data, and/or data representing the digital code as a basis to track media consumption. For instance, over time, the server 118 may continue to receive digital codes, input data and/or data representing the digital codes from the portable device 106 and from other such portable devices. The server 118 may then aggregate the digital codes, input data and/or data representing the digital codes. The aggregated digital codes, input data and/or data representing the digital codes may provide information about the broadcast media people are listening to and/or watching.

2. Exemplary Architecture

As noted earlier, the communication system 100 includes a broadcast system 102, a media player 104, a portable device 106, a radio access network (RAN) 108, a packet data serving node (PDSN) 114, a packet data network 116, and a server 118. In the communication system 100 as shown, the portable device 106 is communicatively linked by a radio access network 108 with a packet data network 116 that provides connectivity with server 118. The packet data network 116 may, for instance, be the Internet or one or more other public and/or private packet-switched networks operating according to the well known Internet Protocol (IP).

The broadcast system 102 may comprise firmware, hardware, software instructions and/or other machine code to (i) mix broadcast media with digital code and/or input data, (ii) convert the broadcast media, digital code and/or input data into audio waveforms, and (iii) send the audio waveforms comprising broadcast media, digital code and/or input data to media player 104. More particularly, the broadcast system 102 may include (i) a media integration application to mix broadcast media with digital code and/or input data, (ii) an audio conversion application to convert the broadcast media, digital code and/or input data into audio waveforms, and (iii) a transmittal application to send the audio waveforms comprising broadcast media, digital code and/or input data to media player 104.

The media player 104 may comprise software instructions and/or other machine code to emit acoustic audio waveforms through an audio speaker. The acoustic audio waveforms preferably comprise broadcast media, digital code and/or input data. Examples of media players include MPlayer, Apple QuickTime Player, and Microsoft Windows Media Player. In addition, the media player 104 may be in a medium such as a computer, television, radio, and/or a private communication system.

The portable device 106 is preferably a cellular wireless communication device, such as a cell phone or wirelessly equipped PDA, a smart phone, or personal computer for instance. The portable device 106 is capable of (i) receiving acoustic audio waveforms comprising broadcast media, digital code and/or input data, (ii) detecting a digital code as an indication of a particular broadcast media being provided in the external audio waveforms, (iii) taking an action with respect to a wireless network, and (iv) receiving information from server 118.

The radio access network (RAN) 108 is shown to include a base transceiver station (BTS) 110, which radiates to define a wireless coverage area in which portable device 106 can operate. BTS 110 is then coupled with a base station controller (BSC) 112, which controls BTS 110 and generally governs air interface communications between portable device 106 and BTS 110. BSC 112 is then coupled with a PDSN 114, which functions as a network access server, providing connectivity with packet data network 116.

In a manner well known in the art, portable device 106 may be arranged to engage in wireless packet-data communication via RAN 108 with entities on packet data network 116. For instance, portable device 106 may employ CDMA2000 or any other wireless packet-data connectivity mechanism.

The server 118 may take the form of one or more computer servers of a form generally known in the art. In a preferred embodiment, the server 118 will be configured to be able to receive and respond to HTTP, FTP, or other types of requests. Also, the server 118 will be configured to (i) receive and store a digital code, input data, and/or data representing the digital code, and (ii) send information relating to the digital code, input data, and/or data representing the digital code to the portable device 106.

Figure 2:
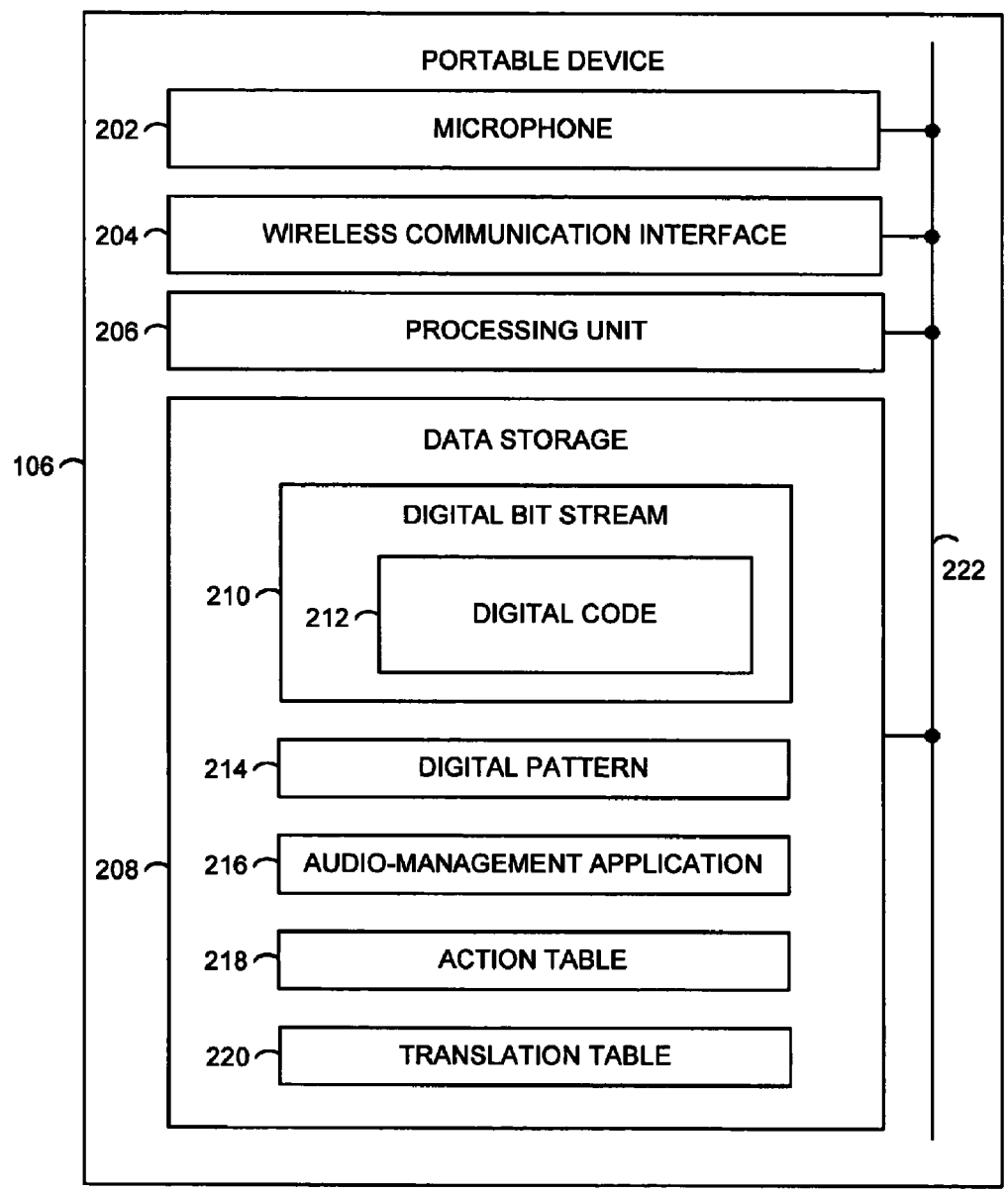
FIG. 2 is a block diagram of a portable device operable within the exemplary embodiment.

FIG. 2 is a simplified block diagram showing functional components of an exemplary portable device 106. As shown in FIG. 2, the exemplary portable device 106 includes a microphone 202, a wireless communication interface 204, a processing unit 206, and data storage 208, all of which may be coupled together by a system bus, network or other mechanism 222. The microphone 202 preferably includes standard microphone technology that is capable of capturing acoustic audio waveforms emitted by the media player 104. The range of the microphone 202 may allow the microphone 202 to capture acoustic audio waveforms. In the exemplary embodiment, the microphone 202 may capture acoustic audio waveforms comprising broadcast media, digital codes and/or input data.

Wireless communication interface 204 may include a chipset such as an MSM series chipset available from Qualcomm Inc., for instance, that facilitates cellular wireless communication, including, preferably, wireless packet data communication in a manner well known in the art. For instance, the wireless communication interface 204 may be configured to support CDMA2000 communication, or wireless packet data communication according to any other air protocol now known or later developed. Wireless communication interface 204 also preferably includes an antenna (not shown) to facilitate such wireless communication over an air interface with RAN 108.

The processing unit 206 may comprise one or more general purpose processors (such as INTEL microprocessors) and/or one or more special purpose processors. The data storage 208, in turn, may comprise one or more volatile and/or non-volatile storage components, and may be integrated in whole or in part with processing unit 206.

In FIG. 2, data storage 208 is shown containing digital bit stream 210, digital pattern 214, audio-management application 216, action table 218, and translation table 220. The portable device 106 may acquire the digital bit stream 210 after the microphone 202 captures external audio waveforms comprising broadcast media, digital code and/or input data. Once captured, the audio-management application 216 may convert embedded acoustic frequencies in the external audio waveforms into digital bit stream 210 in a manner well known in the art. The audio-management application 216 may then store the digital bit stream 210 in data storage 208.

The digital bit stream 210 is shown containing digital code 212. As described above, the microphone 202 may receive acoustic audio waveforms together with audible broadcast media. The microphone may capture the acoustic audio waveforms. These captured acoustic audio waveforms preferably include at least one embedded predefined audio frequency corresponding to the digital code 212. The at least one embedded predefined audio frequency may be inaudible to the human ear. When the audio-management application 216 converts the external audio waveforms into a digital bit stream 210, the audio-management application 216 may also convert the at least one embedded predefined audio frequency into digital code 212. The audio-management application 216 may then store the digital code 212 in data storage 208.

Next, the data storage 208 may include a digital pattern 214. The digital pattern 214 preferably comprises a list of digital codes and/or a pattern of digital codes. Using the digital pattern 214, the audio-management application 216 may compare the list of codes in the digital pattern 214 to digital bit stream 210 to locate digital code 212.

Data storage 208 may further contain audio-management application 216. The audio-management application 216 comprises machine language instructions executable by processing unit 204 to carry out various functions such as (i) converting external audio waveforms into a digital bit stream 210, (ii) storing the digital bit stream 210 and digital code 212 in data storage 208, (iii) comparing the digital bit stream 210 to a digital pattern 216 to locate a digital code 212 within digital bit stream 210, and (iv) causing the portable device 106 to take an action with respect to a wireless network.

Data storage 208 may further contain an action table 218. The action table 218 preferably includes digital codes and corresponding actions. For any particular code in the action table 218, the audio-management application 216 may perform at least one action corresponding to the digital code 212.

The action table 218 may include actions such as (i) translating the digital code 212 locally using a translation table 220, (ii) translating the digital code 212 by communication over a wireless network, (iii) sending an Hyper Text transfer Protocol (HTTP) request to a Uniform Resource Locator (URL) and including the digital code 212 as a query parameter, and (iv) reporting the digital code 212 to a particular URL. The action table 218 may include other types of actions. Additionally, the action table 220 can be downloaded onto the portable device and/or can be preloaded by a manufacturer or distributor of the portable device 106.

FIG. 3 depicts an exemplary action table 218. In FIG. 3, digital codes are depicted in a format represented by letters, numbers and/or characters, shown as example codes. The format is shown for clarity purposes only. Each example code in FIG. 3 may represent the digital code 212 found in the digital bit stream 210. Each example code is further associated with at least one action. For instance, an example code "123*" may correspond to the action of translating the digital code 212.

Furthermore, the example code "123*" includes a wildcard character "*." The "*" may represent any letter, number and/or character following "123." Thus, the example codes "1234", "123&", "123ABCD", "123555" may all correspond to the action of translating the digital code 212.

The audio-management application 216 may use translation table 220 to translate the digital code 212 locally. The translation table 220 preferably includes digital codes and data representing or corresponding with the digital codes. Each digital code in the transaction table 220 may correspond to at least one type of data. The data representing the digital codes may be in any format (i.e., text, numbers, characters, image files, text files, and software programs) in the transaction table 220. The audio-management application 216 may use the translation table 220 to retrieve data representing or corresponding with the digital code 212. Moreover, the translation table 220, like the action table 218, can be downloaded onto the portable device and/or can be pre-loaded by a manufacturer or distributor of the portable device 106.

FIG. 4 depicts an exemplary translation table 220. In FIG. 4, digital codes are depicted in a format represented by letters, numbers and/or characters, shown as example codes. Each example code in FIG. 4 may represent the digital code 212 found in the digital bit stream 210. The example codes are preferably associated with data representing the digital codes. As shown in FIG. 4, the data representing the digital codes may be an Internet address, information about a particular broadcast, electric coupon, and advertisement. Other examples of data are possible as well.

Figure 5:
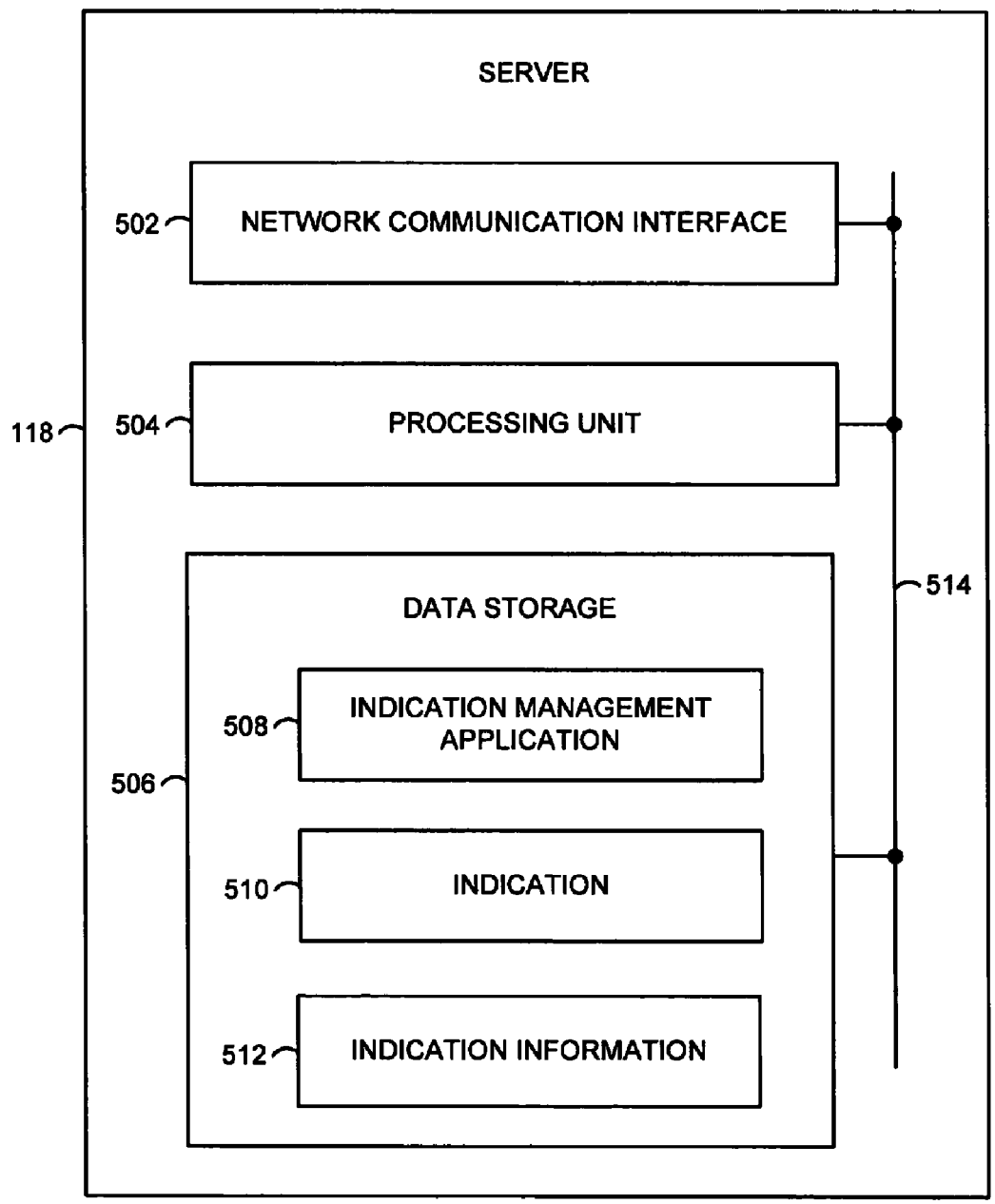
FIG. 5 depicts an exemplary action-table usable in the exemplary embodiment.

FIG. 5 is a simplified block diagram showing functional components of an exemplary server 118. As shown in FIG. 5, the exemplary server 118 includes a network communication interface 502, a processing unit 504, and data storage 506, all of which may be coupled together by a system bus, network or other mechanism 514. The network communication interface 502 may be an Ethernet network communication module of a type well known in the art, facilitating connectivity with packet-data network 116 (e.g., via a router or LAN server).

The processing unit 504 may comprise one or more general purpose processors (such as INTEL microprocessors) and/or one or more special purpose processors. The data storage 506, in turn, may comprise one or more volatile and/or non-volatile storage components, and may be integrated in whole or in part with processing unit 504.

Data storage 406 may include an indication management application 508, indication 510, and indication information 310. The indication management application 508 comprises machine language instructions executable by processing unit 504 to carry out various functions such as (i) receiving the indication 510 and storing the indication 510 in the data storage 506, (ii) retrieving indication information 310 from server data storage 506, (iii) sending indication information 310, and (iv) performing a transaction over the wireless network associated with the indication 510.

The indication 510 is an indication of the at least one predefined acoustic frequency. The portable device 106 transmits the indication to server 118. The indication may be the digital code 212, data representing the digital code 212 as shown in translation table 220, and/or input data. The indication 410 may further be an (i) indication of the digital code 212 that corresponds to at least one predefined acoustic frequency such as an identifier relating to the digital code 312, and (ii) indication of data representing the digital code 212 such as a segment of data representing the digital code 212. For example, the indication may be information about a particular broadcast media that is in the external audio waveforms and/or retrieved from translation table 220.

The indication information 512 comprises information associated with indication 510.

The server 118 may retrieve indication information 512 to send to the portable device 106 and/or to perform a transaction over a wireless network. Examples of indication information 512 include an electronic coupon code and/or a music file. Other examples are possible as well.

3. Exemplary Operation

FIG. 6 provides a generalized flow chart 600 illustrating functions carried out in accordance with the exemplary embodiment. As shown in FIG. 6, at step 602, the process starts with the portable device 106 monitoring external acoustic audio waveforms. These external acoustic audio waveforms preferably comprise embedded acoustic frequencies corresponding to broadcast media, digital code 212 and/or input data. In particular, at least one embedded predefined acoustic frequency preferably corresponds to the digital code 212 and/or input data.

Accordingly, the media player 104 may emit acoustic audio waveforms that are monitored by the portable device 106. The microphone 202 may capture the acoustic audio waveforms that are within a range of the microphone 202. Upon capture, the audio-management application 216 may convert the embedded acoustic frequencies in the external acoustic audio waveforms into a digital bit stream 210 in a manner well known in the art. The audio-management application 216 may then store the digital bit stream 210 or a segment of the digital bit stream 210 in data storage 208.

The stored digital bit stream 210 preferably includes a digital code 312 corresponding to at least one embedded predefined acoustic frequency. The audio-management application 216 may compare the digital bit stream 210 to the digital pattern 214 to locate the digital code 212 within digital bit stream 210. The digital pattern 214 preferably contains at least one digital code that may be similar to the digital code 212 in digital bit stream 210.

At step 604, the portable device 106 detects at least one digital code 212 corresponding to the at least one embedded predefined acoustic frequency. In particular, the audio-management application 216 may detect a digital code 212 in the digital bit stream 210 that matches a digital code in the digital pattern 214.

When the digital code is detected, the audio-management application 216 may use the action table 218 to determine what action to perform. For instance, the audio-management application 216 may compare the detected digital code 312 to a list of digital codes in the action table 218. The application may then find a digital code in the list that matches the digital code 212. The digital code 212 in the action table 218 preferably corresponds to least one action.

If the digital code 212 corresponds to an action such as translating the digital code 212 locally using a translation table 220, the audio-management application 216 may use the translation table 220 to translate the digital code 212 and therefore retrieve the data representing the digital code 212. The data representing the digital code 212 may be an Internet address, information about a particular broadcast, electric coupon, and/or an advertisement, for instance.

Furthermore, the audio-management application 216 may go back and forth between the action table 218 and the translation table 220 to collect more data representing the digital code 212, and to determine what action needs to be taken next. Upon retrieving the data representing the digital code 212, the process then proceeds to the next step of taking an action with respect to a wireless network.

In the case where going back and forth between the action table 218 and the translation table 220 results in an endless loop, the audio-management application 216 may include a loop-stopping mechanism. This loop-stopping mechanism may end the process or proceed to the next step of taking an action with respect to a wireless network.

At step 606, portable device 106 takes an action with respect to a wireless network. The audio-management application 216 may cause the portable device 202 to take an action with respect to a wireless network.

Taking an action with respect to a wireless network may comprise transmitting an indication 510 of the at least one embedded acoustic frequency over the wireless network to server 118. Specifically, taking an action with respect to a wireless network may comprise (i) translating the indication by reporting the indication 510 to a particular URL, (ii) sending an HTTP request that includes the indication 510 as a query parameter to a particular URL, and/or (iii) reporting the indication 510 to a particular URL. The URL can be translated into an IP address of server 118. In turn, the HTTP request and/or the indication may then go to the server 118 at that IP address. The indication management application 508 in server 118 may receive the indication and store the indication in data storage 506.

The indication 510 of the at least one predefined acoustic frequency may be the digital code 212, the data representing the digital code 212 and/or input data. The indication 510 may further be an (i) indication of the digital code that corresponds to at least one predefined acoustic frequency such as an identifier relating to the digital code 212, and (ii) indication of data representing the digital code 212 such as a segment of data representing the digital code 212. For example, the indication 510 sent to the server 118 may be information about a particular broadcast, and/or information about the portable device 106.

Taking an action with respect to a wireless network may further comprise sending a request to the server 118 to transmit information relating to the indication back to the portable device 106. In response to transmitting this request to the server 118, the indication management application 508 may retrieve indication information 512 from data storage 506. The indication management application 508 may then send the retrieved indication information 512 to the portable device 106. In response, the audio-management application 216 in the portable device 106 may receive the indication information 512. The audio-management application 216 may then present the indication information 512 to a user, or may simply store indication information 512 in data storage 208. Examples of indication information 412 may include a music file and/or an electronic coupon code. Other examples of indication information 412 are possible as well.

Further, taking an action with respect to a wireless network may also comprise accessing an Internet resource located at an Internet address. The Internet source may be an Internet web page and/or any information relating the Internet web page. Other examples of the Internet source are possible as well.

Additionally, in response to transmitting the indication 510, the indication management application 508 may perform a transaction over the wireless network. For instance, the indication management application 508 may send the result of the transaction to the portable device 106. The audio-management application 216 in the portable device 106 may receive the result of the transaction, and the audio-management application 216 may then present the result of the transaction to a user, or may simply store the result in data storage 208. Other examples of transactions may include performing a function associated with portable device 106, and/or redeeming an electronic coupon, for instance.

Further, the portable device 106 may monitor the acoustic audio waveforms continuously, periodically and/or in response to various triggering events. The triggering event may be an event associated with (i) an alarm in the portable device 106 for monitoring acoustic audio waveforms at a particular time and/or day, and/or (ii) a function for monitoring acoustic audio waveforms that can be turned on/off by a user of the portable device 106. Other examples of triggering events are possible as well.

Accordingly, the portable device may continue to perform steps 602, 604, and 606 as indicated above. The server 118 and/or other such servers may continue to receive the indications relating to broadcast media from portable device 106 and other such portable devices. The server 118 and/or other such servers may store the various indications. The server 118, and/or other such servers may then organize the indications relating to broadcast media to track media consumption by people.

Broadcasters and advertisers may aggregate and/or translate the organized indications relating to broadcast media to determine channel and programming preferences, and to evaluate the effectiveness of marketing campaigns. The aggregated indications may include (i) types of broadcast media people are listening to and/or watching (i.e., television programs, radio programs, interne programs and advertisements), (ii) types of broadcast mediums people use to listen to and/or watch the broadcast media (i.e., television, radio, satellite, interne and private communication system), (iii) demographic data on the people that are listening to and/or watching the broadcast media (i.e., age, ethnicity, education and religion), and (iv) locations where people are listening to and/or watching the broadcast media (i.e., homes, airports and workplaces).

Broadcasters may then use the indications to determine channel and programming preferences of users. Meanwhile, advertisers may use the indications to determine user preferences of advertising mediums, and to evaluate the effectiveness of marketing campaigns.

4. Conclusion

An exemplary embodiment of the present invention has been described above. Those skilled in the art will understand, however, that changes and modifications may be made to this embodiment without departing from the true scope and spirit of the present invention, which is defined by the claims. For instance, the exemplary embodiment is described as being performed it the digital domain, the exemplary embodiment may be performed in the analog domain.

We claim:

1. In a portable device containing (i) action data that includes a plurality of codes and that specifies for each code a corresponding action and (ii) translation data that includes the plurality of codes and that specifies for each code a corresponding indication of the code, a method comprising:

receiving into a microphone of the portable device an audio waveform;

the portable device detecting a code in the received audio waveform;

responsive to detecting the code in the received audio waveform, the portable device determining that the detected code is included in the plurality of codes and the portable device determining from the action data an action corresponding with the detected code;

the portable device performing the determined action corresponding to the detected code, wherein the determined action comprises using the translation data to translate the detected code into an indication of the detected code and automatically transmitting via a wireless communication network to a network server a request comprising the indication of the detected code; and the portable device receiving from the network server, in response to the transmitted request, information related to the indication of the detected code.

2. The method of claim 1, wherein the action data is included in an action table.

3. The method of claim 1, wherein the method is carried out automatically by the portable device.

4. The method of claim 1, wherein the code being detected is represented by a predefined acoustic frequency in the received audio waveform, and wherein detecting the code in the received audio waveform comprises detecting the predefined acoustic frequency in the received audio waveform.

5. The method of claim 4, wherein the predefined acoustic frequency is inaudible to a human ear.

6. The method of claim 1, wherein detecting the code in the received audio waveform comprises a function selected from the group consisting of:

monitoring received audio waveforms continuously;
monitoring received audio waveforms periodically; and
monitoring received audio waveforms in response to a triggering event.

7. The method of claim 1, further comprising converting the received audio waveform into a digital bit stream, wherein detecting the code in the received audio waveform comprises detecting in the digital bit stream a digital bit pattern corresponding to the code.

8. The method of claim 1, wherein the indication of the detected code comprises the detected code.

9. The method of claim 1, wherein the indication of the detected code comprises data representing the detected code.

10. The method of claim 1, wherein the plurality of codes includes at least one entry with at least one wildcard character.

11. The method of claim 1, wherein the translation data is included in a translation table.

12. The method of claim 1, wherein the information related to the indication of the detected code comprises at least one of a music file and an electronic coupon code.

13. A portable device comprising:
a processor;
data storage containing (i) action data that includes a plurality of codes and that specifies for each code a corresponding action and (ii) translation data that includes the plurality of codes and that specifies for each code a corresponding indication of the code;
a microphone;
a wireless communication interface; and
program logic executable by the processor for (i) detecting a code in an audio waveform received by the microphone, (ii) responsive to detecting the code in the received audio waveform, determining that the detected code is included in the plurality of codes and determining from the action data an action corresponding with the detected code, (iii) performing the determined action corresponding to the detected code, wherein the determined action comprises using the translation data to translate the detected code into an indication of the detected code and automatically transmitting via the wireless communication interface and a wireless communication network, to a network server, a request comprising the indication of the detected code, and (iv) receiving information related to the indication of the detected code via the wireless communication network and the wireless communication interface, from the network server, in response to the transmitted request.

14. The portable device of claim 13, wherein the action data is included in an action table.

15. The portable device of claim 13, wherein the translation data is included in a translation table.

16. The method of claim 13, wherein the information related to the indication of the detected code comprises at least one of a music file and an electronic coupon code.

17. In a portable device containing (i) an action table that includes a plurality of codes and that specifies for each code a corresponding action and (ii) a translation table that includes the plurality of codes and that specifies for each code a corresponding indication of the code, a method comprising:

receiving into a microphone of the portable device an audio waveform;

the portable device detecting a code in the received audio waveform;

responsive to detecting the code in the received audio waveform, the portable device determining that the detected code is included in the plurality of codes and the portable device determining from the action data an action corresponding with the detected code;

the portable device performing the determined action corresponding to the detected code, wherein the determined action comprises (i) using the translation table to translate the detected code into an indication of the detected code and (ii) automatically transmitting via a wireless communication network to a network server a request comprising the indication of the detected code; and the portable device receiving from the network server, in response to the transmitted request, information related to the indication of the detected code.

18. The method of claim 17, wherein the method is carried out automatically by the portable device.

19. The method of claim 17, wherein the plurality of codes includes at least one entry with at least one wildcard character.

20. The method of claim 17, wherein the information related to the indication of the detected code comprises at least one of a music file and an electronic coupon code.

* * * * *